UNITED STATES PATENT OFFICE.

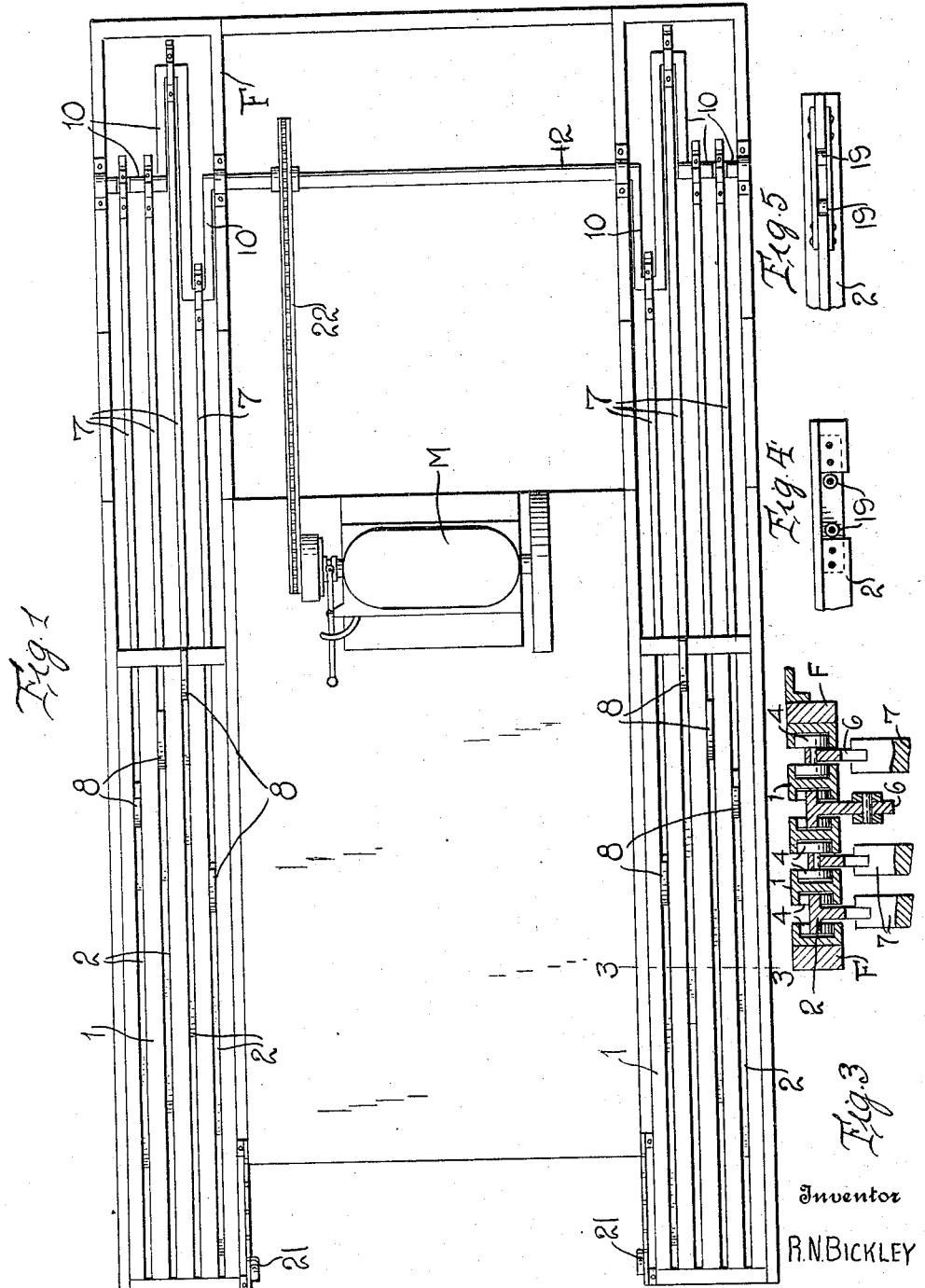

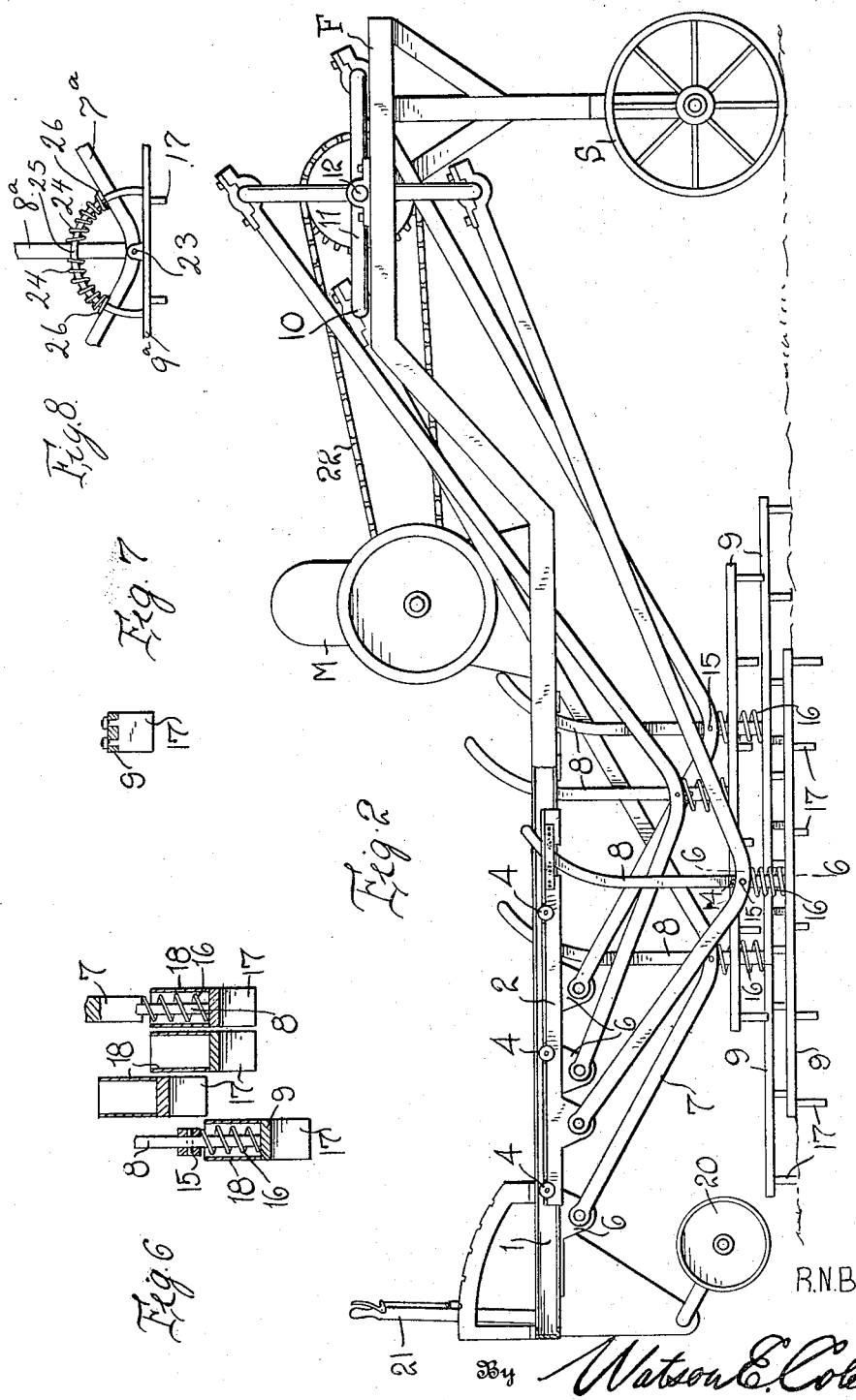

RALPH N. BICKLEY, OF DUNN CENTER, NORTH DAKOTA.

TRACTOR.

1,201,432.  Specification of Letters Patent.  Patented Oct. 17, 1916.

Application filed September 25, 1915. Serial No. 52,592.

*To all whom it may concern:*

Be it known that I, RALPH N. BICKLEY, a citizen of the United States, residing at Dunn Center, in the county of Dunn and State of North Dakota, have invented certain new and useful Improvements in Tractors, of which the following is a specification, reference being had to the accompanying drawings.

This invention relates to certain improvements in tractors and has relation more particularly to a device of this general character of a stepper type; and an object of the invention is to provide novel and improved mechanism whereby the tractor may be propelled with convenience and facility irrespective of the condition of the surface over which the same is intended to travel.

The invention consists in the details of construction and in the combination and arrangement of the several parts of my improved tractor whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view in top plan of a tractor constructed in accordance with an embodiment of my invention, the steering wheels being omitted; Fig. 2 is a view in side elevation of my improved tractor as herein embodied, with a portion broken way; Fig. 3 is a sectional view taken substantially on the line 3—3 of Fig. 1; Fig. 4 is a fragmentary view in side elevation of one of the plungers as herein embodied, with a portion thereof being omitted to illustrate certain details of construction as herein embodied; Fig. 5 is a view in bottom plan of the fragment of the plunger as illustrated in Fig. 4; Fig. 6 is a sectional view taken substantially on the line 6—6 of Fig. 2, with guards applied to the shoes; Fig. 7 is a detail sectional view illustrating the mounting of a calk as herein disclosed; and Fig. 8 is a fragmentary detail view illustrating a further embodiment of my invention.

As disclosed in the accompanying drawings, F denotes the supporting frame of my improved tractor of predetermined configuration and having its forward extremity suitably supported by the steering wheels S which may be of any desired type. In practice, I prefer to have the rear portion of the frame F disposed in a plane lower than the forward extremity of the frame, which preferred arrangement is clearly illustrated in Fig. 2 of the accompanying drawings. The opposite longitudinal sides of the frame F at the rear thereof are provided with the parallel guide-ways 1 preferably formed of eye beams and between which are mounted for reciprocal movement the slides or plungers 2, said slides or plungers 2 being provided with the anti-friction rollers 4 coacting with the track-ways 1, for a purpose which is believed to be clearly apparent to those skilled in the art to which my invention appertains.

Each of the plungers or slides 4 adjacent its rear extremity is provided with a depending web 6 with which is pivotally engaged an extremity of a beam 7, the rear portion of which being disposed on a downward incline and pivotally engaged with a guiding stem 8 of a shoe 9 and the forward portion of said beam is inclined upwardly and operatively engaged, as at 10, with one of the cranks 11 carried by the shaft 12. The shaft 12 is rotatably supported by the frame F adjacent the forward end thereof and is disposed transversely thereof. In practice, I have found it particularly advantageous to have four plungers at opposites sides of the frame and consequently four cranks 11 and beams 7 at each side thereof. It is also preferred that the cranks 11 be successively disposed in perpendicular relation. As herein embodied, each guiding stem is disposed directly through its beam 7 as particularly indicated in Fig. 6, and said stem is provided with a longitudinally disposed slot 14 through which the pivotal pin 15 carried by the stem 7 is directed. This arrangement is afforded in order to permit the stem 7 to have a slight upward movement to compensate for any inaccuracies of the surface over which my improved tractor is traveling. A downward tension is normally imposed upon each of the shoes 9 by the expansible member 16, herein disclosed as a coil spring, interposed between each of the shoes 9 and its coacting beam 7 as is clearly shown in Figs. 2 and 6.

As herein embodied, each of the shoes 9 comprises an elongated member of predetermined dimensions and having detachably engaged therewith the calks 17 whereby an effective engagement with the surface over which the device travels is assured. As is particularly illustrated in Fig. 6, I find it of advantage to have each of the shoes 9 provided with the upstanding housing or marginal flanges 18 to prevent the adjacent shoes from overlapping.

The stems 8 are disposed through their respective plungers or slides 2 and pass between anti-friction rollers 19 carried by said plungers (Figs. 4 and 5) and said stems are curved forwardly so as to hold the shoe level with the frame when raising and lowering.

I also find it of advantage to employ the trailing wheels 20 capable of being brought into or out of contact with the surface over which the device travels through the medium of the operating levers 21. By this arrangement, it will be seen that as desired, the shoes may be raised out of contact with the surface or the weight upon the shoes 9 regulated.

The shaft 12 is adapted to be rotated in any conventional manner but preferably by the chain connection 22 leading from the motor M supported by the frame F.

As disclosed in Fig. 8, the beam 7ª is pivoted, as at 23, directly to the shoe 9ª so that said shoe is capable of rocking movement so that the shoe will compensate for any unevenness in the surface over which the device travels. The guiding stem 8ª is also pivotally engaged with the shoe 9ª and coacting with the stem are the expansible members 24 disposed at opposite sides thereof and encircling the rod 25 preferably semicircular in form and having its extremities secured directly to the shoe 9ª in advance and to the rear of the pivotal connection 23. It will be readily understood that the lower extremities of the rod 25 are bifurcated in order to permit the insertion therethrough of the beam 7ª. It is to be observed that the rod 25 is provided with the shoulders 26 with which the expansible members 24 coact.

From the foregoing description, it is thought to be obvious that a tractor constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A tractor including a frame, a reciprocating slide supported by the frame, a crank, means for rotating the crank, a shoe, and a member interposed between the crank and slide and operatively engaged with the shoe.

2. A tractor including a frame, a reciprocating slide supported by the frame, a crank, means for rotating the crank, a shoe, a member interposed between the crank and slide and operatively engaged with the shoe, and a guiding means carried by the shoe coacting with the slide.

3. A tractor including a frame, a reciprocating slide supported by the frame, a crank, means for rotating the crank, a shoe, and a member interposed between the crank and slide and operatively engaged with the shoe, said shoe being capable of yieldable movement independently of its connection with the member.

4. A tractor including a frame, a reciprocating slide supported by the frame, a crank, means for rotating the crank, a shoe, a member interposed between the crank and slide and operatively engaged with the shoe, and an upstanding guiding stem carried by the shoe and extended through the slide.

5. A tractor including a frame, a reciprocating slide supported by the frame, a crank, means for rotating the crank, a shoe, a member interposed between the crank and slide and operatively engaged with the shoe, and an upstanding guiding stem carried by the shoe and extended through the slide, the member interposed between the crank and the slide being secured to said stem.

6. A tractor including a frame, a reciprocating slide supported by the frame, a crank, means for rotating the crank, a shoe, a member interposed between the crank and slide and operatively engaged with the shoe, an upstanding guiding stem carried by the shoe and extended through the slide, the member interposed between the crank and the slide being secured to said stem, the stem being capable of limited longitudinal movement independently of the member, and an expansible member interposed between the first named member and the shoe.

7. A tractor including a frame, a reciprocating slide supported by the frame, a shoe, operating means, and a member interposed between the operating means and the slide and operatively engaged with the shoe.

In testimony whereof I hereunto affix my signature in the presence of two witnesses.

RALPH N. BICKLEY.

Witnesses:
ALBERT O. BJORGE,
GROVER E. TOLLEFSON.

Copies of this patent may be obtained for five cents each, by addressing the "Commissioner of Patents, Washington, D. C."